US007653975B2

(12) United States Patent
Hu

(10) Patent No.: US 7,653,975 B2

(45) Date of Patent: Feb. 2, 2010

(54) CLAMPING APPARATUS OF A PULLER

(76) Inventor: Chih Kuo Hu, No. 28, Lane 237, Wucyuan 5th St., West District, Taichung City 403 (TW)

( * ) Notice: Subject to any disclaimer, the term of this patent is extended or adjusted under 35 U.S.C. 154(b) by 0 days.

(21) Appl. No.: 12/076,710

(22) Filed: Mar. 21, 2008

(65) Prior Publication Data

US 2009/0236573 A1 Sep. 24, 2009

(51) Int. Cl.
*B23P 19/04* (2006.01)

(52) U.S. Cl. .............................. 29/259; 29/255; 29/261

(58) Field of Classification Search ................... 29/259, 29/255, 252, 261, 262, 267, 283
See application file for complete search history.

(56) References Cited

U.S. PATENT DOCUMENTS 1,268,285 A * 6/1918 Schilling ..................... 29/259
3,188,115 A * 6/1965 Morrish et al. ................ 285/18
3,423,082 A * 1/1969 Reyner ....................... 269/104
4,034,458 A * 7/1977 Ford et al. .................... 29/259
4,077,103 A * 3/1978 Kelley ......................... 29/259
5,557,833 A * 9/1996 Pool ............................ 29/261
6,581,261 B1 * 6/2003 Chen ........................... 29/252
2005/0229373 A1 * 10/2005 Hu et al. ....................... 29/261

* cited by examiner

*Primary Examiner*—Lee D Wilson
(74) *Attorney, Agent, or Firm*—Wang Law Firm, Inc.; Li K. Wang

(57) ABSTRACT

A clamping apparatus of a puller includes a first clamping element, two second clamping elements, four pivoting elements and three adjusting rod modules. Each pivoting element is pivotally coupled to both ends of the first clamping element and an end of each second clamping element corresponding to the first clamping element. Another end of each second clamping element has a transverse penetrating hole. One of the adjusting rod modules is passed through a penetrating hole of each second clamping element, and the other two adjusting rod modules are passed through the penetrating hole of each pivoting element, so that the adjusting rod modules are arranged substantially in a triangular shape. The pivoting element is installed between the clamping elements for pivotally turning each adjusting rod module and automatically guiding to the central position and increasing the range between the clamping elements for mounting and installing a bearing easily.

11 Claims, 11 Drawing Sheets

CLAMPING APPARATUS OF A PULLER

BACKGROUND OF THE INVENTION

1. Field of the Invention

The present invention relates to a clamping apparatus of a puller, and more particularly to a clamping apparatus capable of increasing the range between clamping elements of a puller by a pivoting element for mounting a bearing, and automatically guiding the bearing to a central position for a quick installation of the bearing.

2. Description of the Related Art

Referring to FIG. 11 for a traditional puller 9, the puller 9 includes a driving element 91, a contractable rod 92, three pulling rods 93, three clamping elements 94 and three adjusting rod modules 95. The driving element 91 is connected to the three pulling rods 93, and an end of each pulling rod 93 is connected to a clamping element 94, and each adjusting rod module 95 is passed into an end of one of the two clamping elements 94, and each clamping element 94 is integrated with the adjusting rod modules 95 to form a circular shape to facilitate installing a bearing A.

As to the adjusting rod modules 95 of the puller 9, each adjusting rod module 95 comprises a screw rod 951 and a screw nut 952, so that when the puller 9 is used, each screw nut 952 is turned to change the distance between the clamping elements 94. To adjust each clamping element 94 to fit the diameter of the bearing A, users have to take some time to adjust the adjusting rod modules 95 one by one and turn the screw nut 952 of each screw rod 951 to fit the diameter of the bearing A in order to clamp the external periphery of the bearing A by the puller 9. Each screw nut 952 is secured after the puller 9 is in a clamping position, such that each clamping element 94 abuts the external periphery of the bearing A. When each screw nut 952 is turned again, the bearing A can be removed.

Since the puller 9 comes with a certain weight, and it is necessary to adjust the distance between the adjusting rod modules 95, so that the clamping elements 94 are arranged equidistantly from each other in a circle for providing an even pulling force to each pulling rod 93 to remove the bearing A. If the installation procedure requires users to secure the screw nuts 952 one by one and adjust each screw nut 952 to an appropriate position, the application of using the puller 9 to install the bearing A is inconvenient. Furthermore, each adjusting rod module 95 cannot be adjusted to an appropriate distance and automatically guided to an appropriate position. Obviously, the aforementioned puller used for the installation of the bearing A is very inconvenient.

SUMMARY OF THE INVENTION

The primary objective of the present invention is to overcome the foregoing shortcomings of the prior art by providing a clamping apparatus of a puller, wherein a pivoting element is installed between each clamping element and each adjusting rod module for pivotally turning each pivoting element and each adjusting rod module, and automatically guiding a clamping apparatus to an appropriate position.

Another objective of the present invention is to overcome the foregoing shortcomings of the prior art by providing a clamping apparatus of a puller, wherein four pivoting elements are used for producing four pivoting points to move four link rods and increase the range between the clamping element for clamping the bearing, when the clamping apparatus is mounted, and guide the puller to the center for an easy installation of the bearing.

A further objective of the present invention is to overcome the foregoing shortcomings of the prior art by providing a clamping apparatus of a puller, wherein a spring is installed to minimize the displacement caused by the increased distance between the clamping elements, and the resilience of each spring is used for resuming each clamping element to its original position.

Another further objective of the present invention is to install a spring to both ends of each adjusting rod module for simplifying the process of loosening the screw nuts to achieve the effect of installing the clamping apparatus easily.

To achieve the foregoing objectives, the present invention provides a clamping apparatus installed at the bottom of an actuating element of a puller, and the actuating element includes a driving element for abutting a bearing and an adjusting element having three pulling rods, wherein the clamping apparatus comprises:

a first clamping element, having a main body and a clamping portion, and the clamping portion and the main body having a height difference, and both ends of the main body having a pivotal connecting portion, and the central position of the main body having a coupling hole for connecting one of the pulling rods of the adjusting element;

two second clamping elements, each having a main body and a clamping portion, and each clamping portion having a height difference with the main body, and each main body having a pivotal connecting portion disposed at an end corresponding to a pivotal connecting portion of the first clamping element, and a transverse penetrating hole disposed at another end of each main body, and the axle center of each penetrating hole being disposed linearly with each other, and the central position of each main body having a coupling hole for connecting other two pulling rods of the adjusting element;

four pivoting elements, each being pivotally coupled to a pivotal connecting portion of the first clamping element and a pivotal connecting portion of the second clamping element; and three adjusting rod modules, one of the adjusting rod modules passing through a penetrating hole of each second clamping element, and other two of the adjusting rod modules passing through a penetrating hole of each pivoting element, such that the adjusting rod modules are connected and arranged substantially in a triangular shape.

DETAILED DESCRIPTION OF THE PREFERRED EMBODIMENTS

Figure 1:
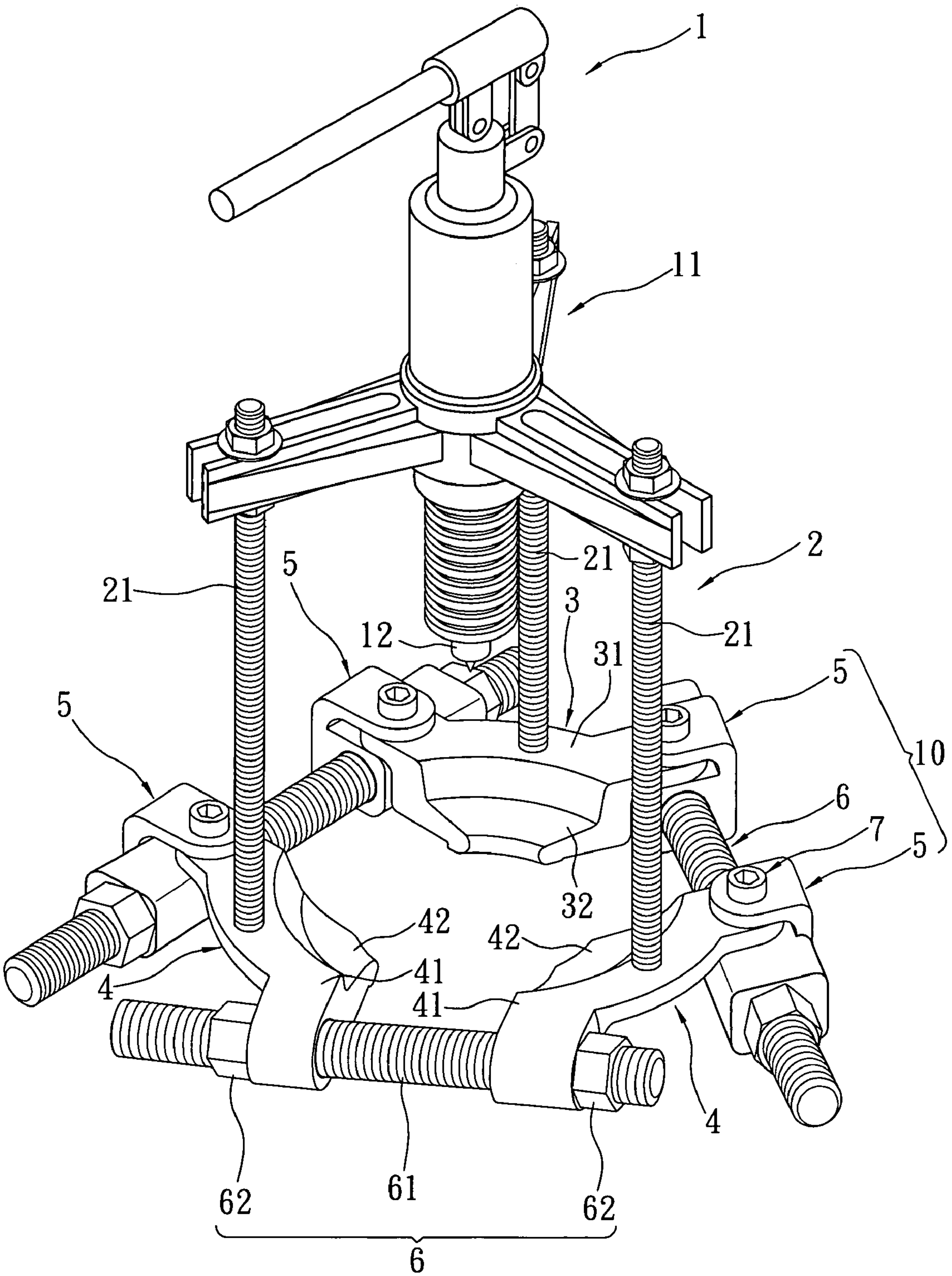
FIG. 1 is a perspective view of a first preferred embodiment of the present invention.
Figure 2:
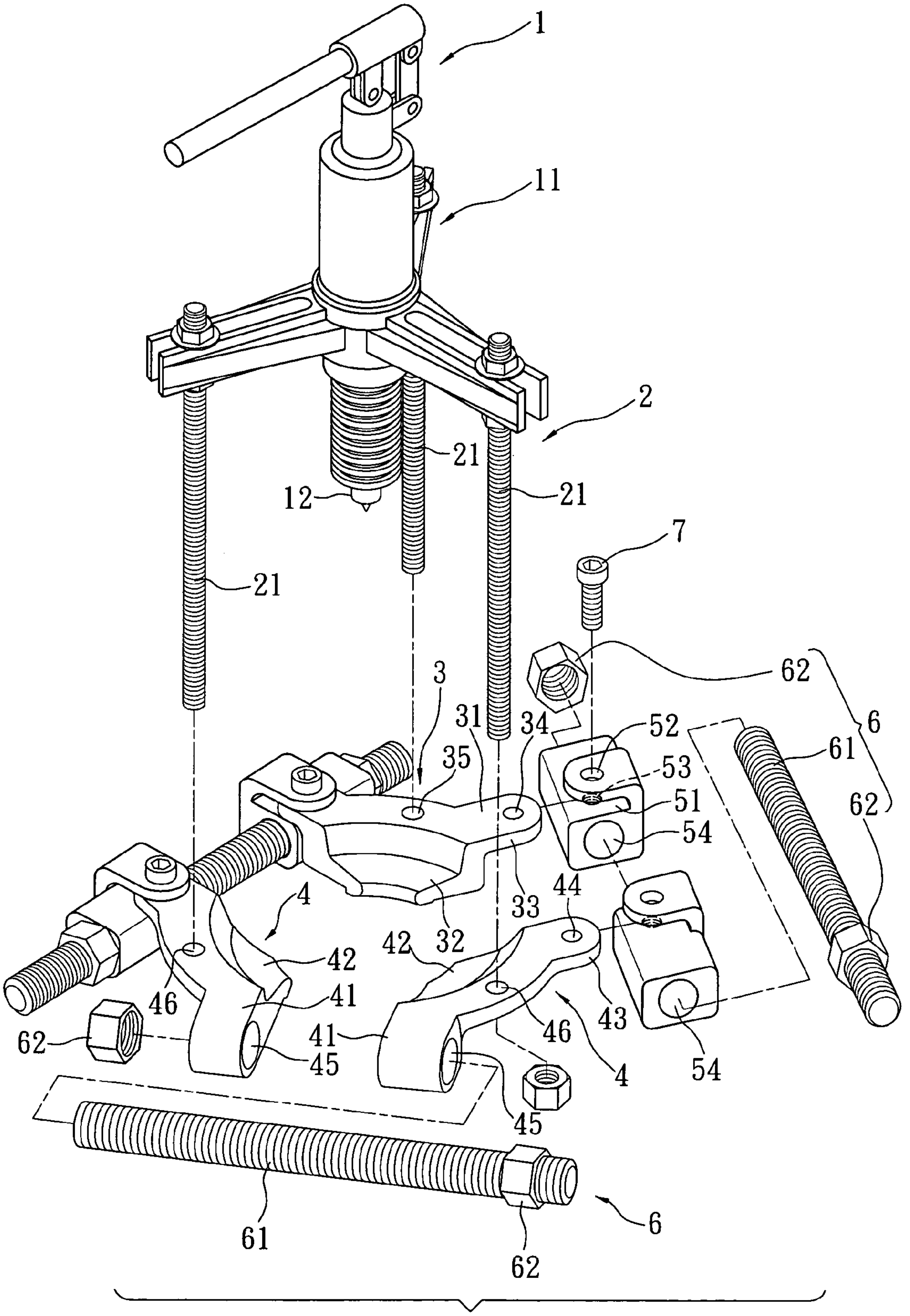
FIG. 2 is an exploded view of a first preferred embodiment of the present invention.

Referring to FIGS. 1 to 10 for the preferred embodiments of the present invention, the embodiments are provided for the purpose of illustrating the present invention only, but not intended to limit the scope of the invention.

The first preferred embodiment of the present invention provides a clamping apparatus of a puller 10 as shown in FIGS. 1 to 5, and the clamping apparatus is installed at the bottom of an actuating element 11 of a puller 1, and the actuating element 11 includes a driving element 12 abutting a bearing B and an adjusting element 2 having three pulling rods 21, wherein the clamping apparatus 10 comprises:

a first clamping element 3, substantially in an arc shape, and having a main body 31 and a clamping portion 32, and the clamping portion 32 and the main body 31 having a height difference, and the main body 31 having a pivotal connecting portion 33 disposed on both arc-shaped ends, wherein the pivotal connecting portion 33 of this embodiment has a longitudinal through hole 34, and the main body 31 has a coupling hole 35 disposed at the central position of the main body 31 for connecting one of the pulling rods 21 of the adjusting element 2;

two second clamping elements 4, each being substantially in an arc shape, and having a main body 41 and a clamping portion 42, and each clamping portion 42 having a height difference with the main body 41, and each main body 41 having a pivotal connecting portion 43 disposed at an end corresponding to the pivotal connecting portion 33 of the first clamping element 3, wherein the pivotal connecting portion 43 of this embodiment has a longitudinal through hole 44, and another end of each main body 41 has a transverse penetrating hole 45, and the axle center of each penetrating hole 45 is disposed linearly with each other, and the central position of each main body 41 has a coupling hole 46 for connecting other two pulling rods 21 of the adjusting element 2;

four pivoting elements 5, each having a horizontal cut groove 51, and each cut groove 51 having a longitudinal through hole 52 disposed at the top of each groove 51 and a longitudinal screw hole 53 at the bottom of the groove 51, and the through hole 52 and the screw hole 53 being disposed linearly with each other, and each pivoting element 5 having a penetrating hole 54 parallel to the cut groove 51, and each pivoting element 5 using its cut groove 51 to pivotally couple each pivotal connecting portion 33, 43 of the first clamping element 3 and each second clamping element 4, and a plurality of pivots 7 being passed through the through hole 52 of each pivoting element 5 and extended into the through hole 34, 44 of the first clamping element 3 and each second clamping element 4 and secured to the screw hole 53 of each pivoting element, such that each pivoting element 5 can be pivotally turned at the pivotal connecting portions 33, 43 of the first clamping element 3 and the second clamping element 4, wherein the pivots 7 of this embodiment are screws;

three adjusting rod modules 6, one of the adjusting rod module 6 passing through penetrating hole 45 of each second clamping element 4, and the other two adjusting rod modules 6 passing through the penetrating hole 54 of each pivoting element 5 to form a substantially triangular shape by the adjusting rod modules 6, wherein each adjusting rod module 6 in this embodiment comprises a screw rod 61 and two screw nuts 62, and one of the screw rods 61 passes through the penetrating hole 45 of each second clamping element 4, and each of the other two screw rods 61 passes through the penetrating hole 54 of the pivoting element 5 pivotally coupled to the pivotal connecting portion 43 of each second clamping element 4 and the penetrating hole 54 of the pivoting element 5 pivotally coupled to the pivotal connecting portion 33 of the first clamping element 3, and each screw nut 62 is secured separately at both ends of each screw rod 61 for positioning the clamping element 3, 4.

Figure 3:
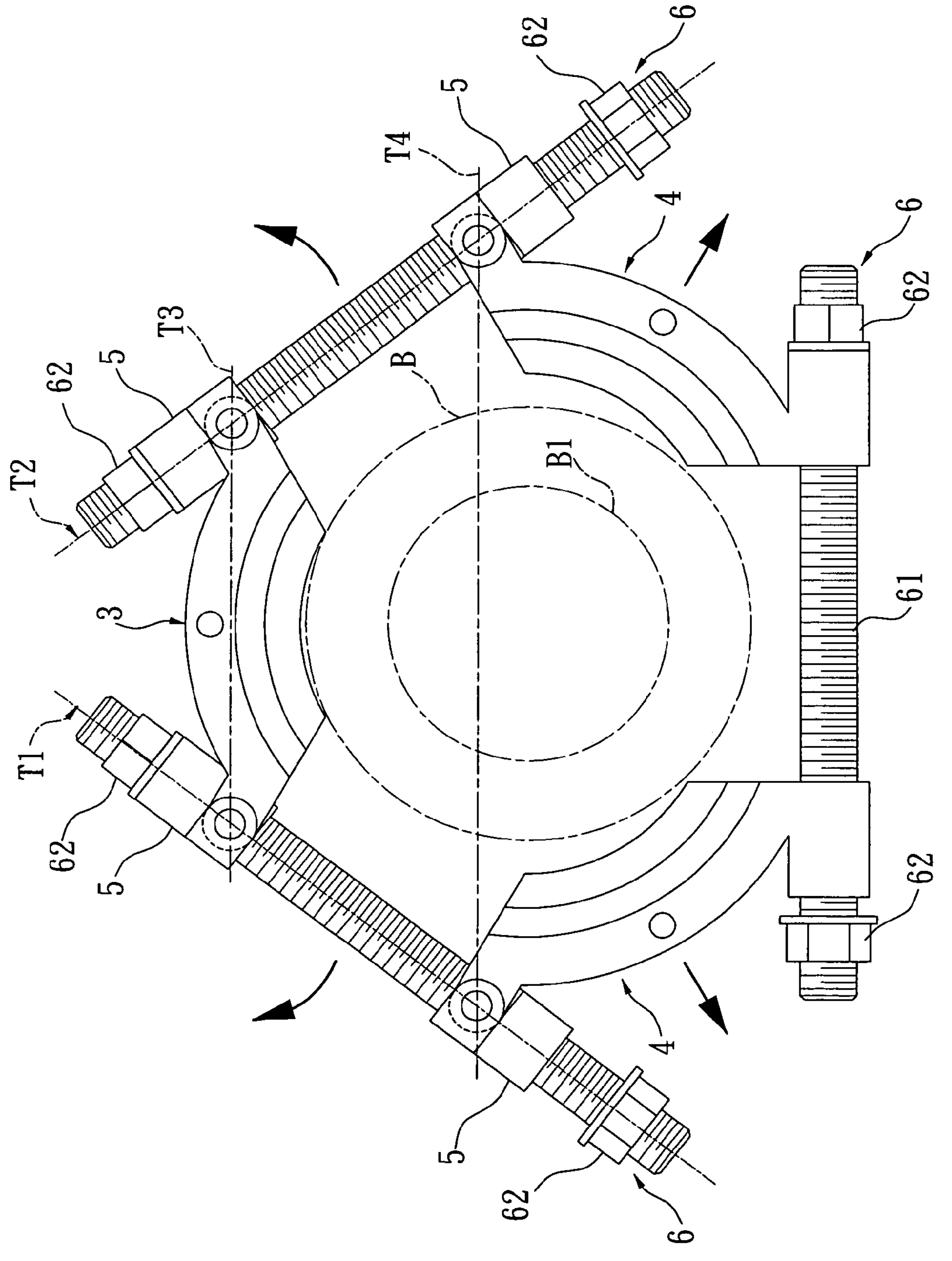
FIG. 3 is a schematic view of an application status in accordance with a first preferred embodiment of the present invention.
Figure 4:
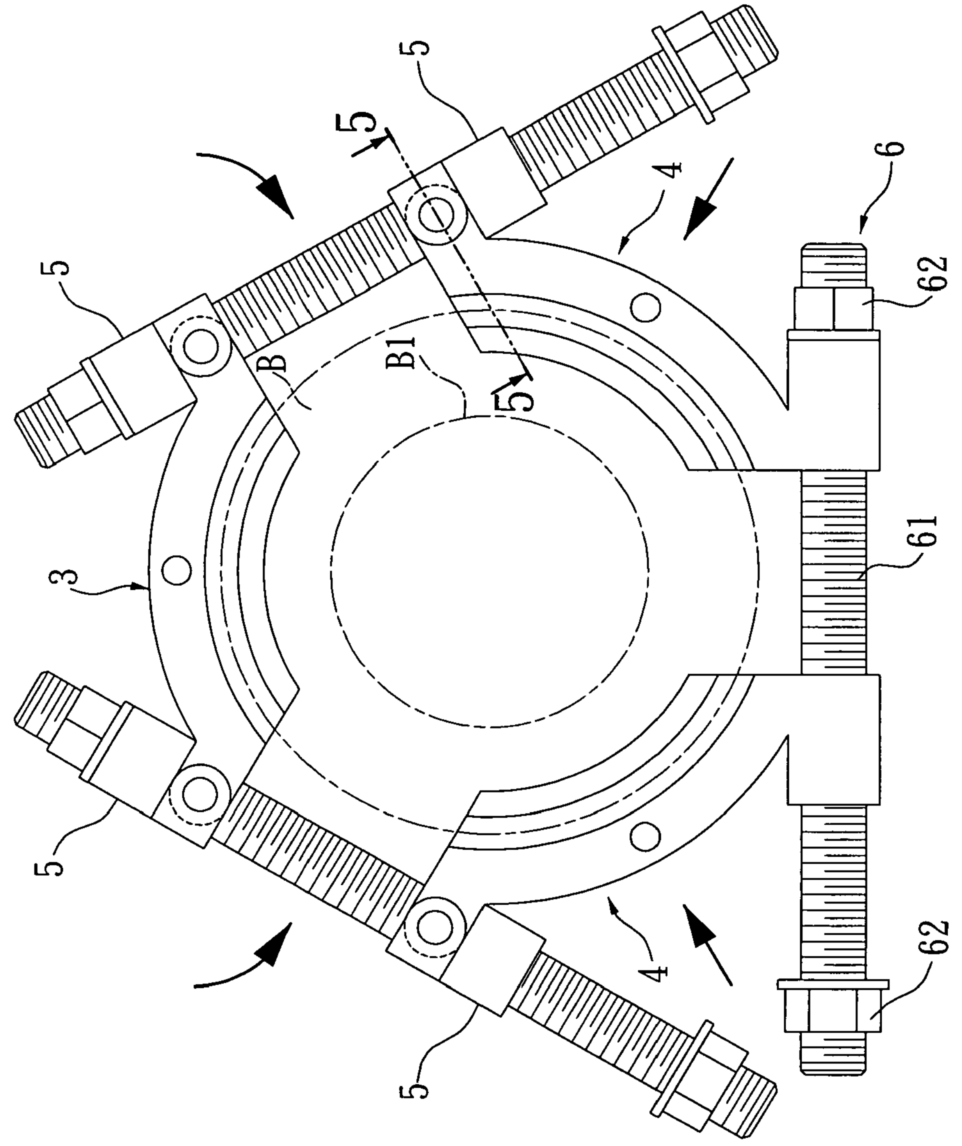
FIG. 4 is a schematic view of another application status in accordance with a first preferred embodiment of the present invention.
Figure 5:
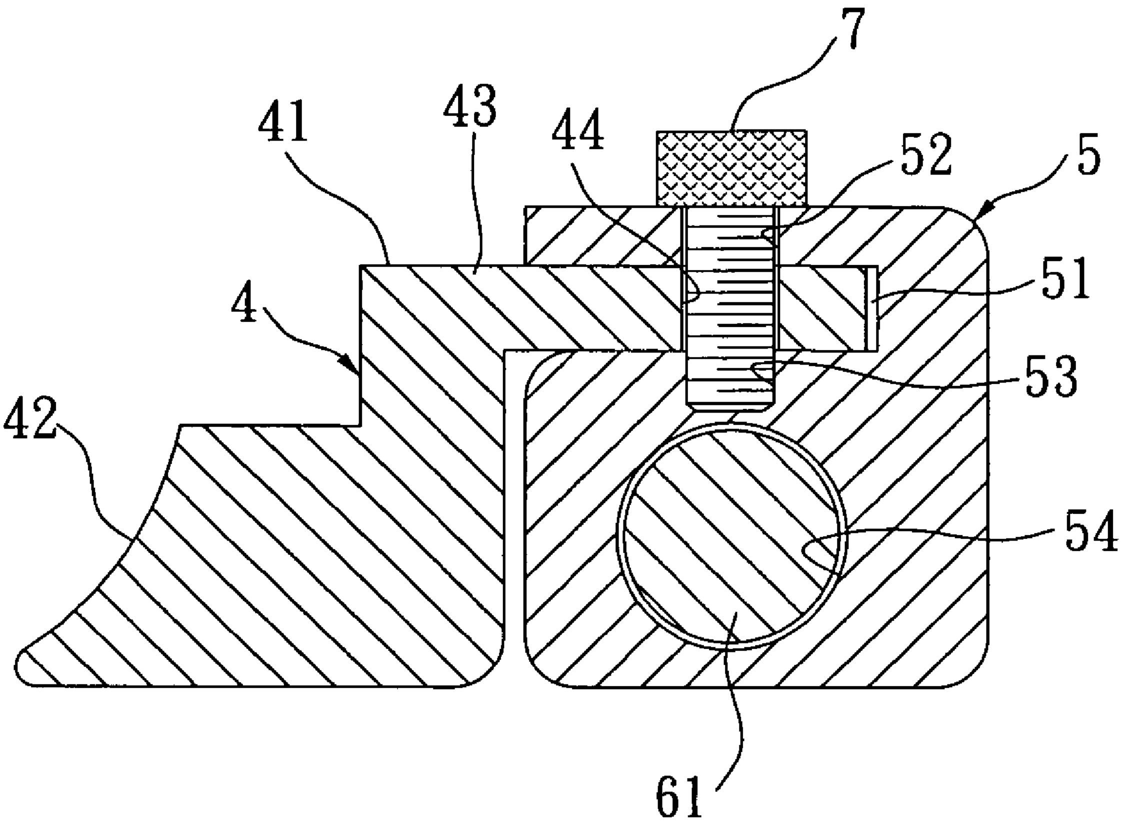
FIG. 5 is a sectional view of Line 5-5 as depicted in FIG. 4.

In FIGS. 3 to 5, a clamping apparatus is mounted onto a bearing B for removing the bearing B from an axis B1. Firstly, the screw nut 62 of each adjusting rod module 6 is loosened slightly, and each second clamping element 4 is pulled towards left and right sides to increase the distance between the first clamping element 3 and the second clamping element 4. Now, each clamping element 3, 4 and each adjusting rod module 6 constitute a mechanism for moving four link rods T1, T2, T3, T4, so that when each second clamping element 4 is pulled open and mounted onto the bearing B, each pivoting element 5 pivotally turns each adjusting rod module 6 to mount the bearing B, and the position of each link rod T1, T2, T3, T4 automatically guides the bearing B to the central position for mounting the bearing B, and then each screw nut 62 is secured to clamp each clamping element 3, 4 to the bearing B. This arrangement can mount the clamping apparatus onto the bearing B easily. A driving element 12 of the actuating element 11 abuts the axis B1 and pulls each pulling rod 21 from the adjusting element 2 to remove the bearing B.

In view of the advantages of the invention, four pivoting points are produced by the four pivoting elements, so that the four link rods can be moved, and the range between the clamping elements for mounting the bearing B can be increased, and the bearing is guided automatically for the installation, so as to provide an overall easy installation of the bearing, since the puller generally comes with a certain weight.

Figure 6:
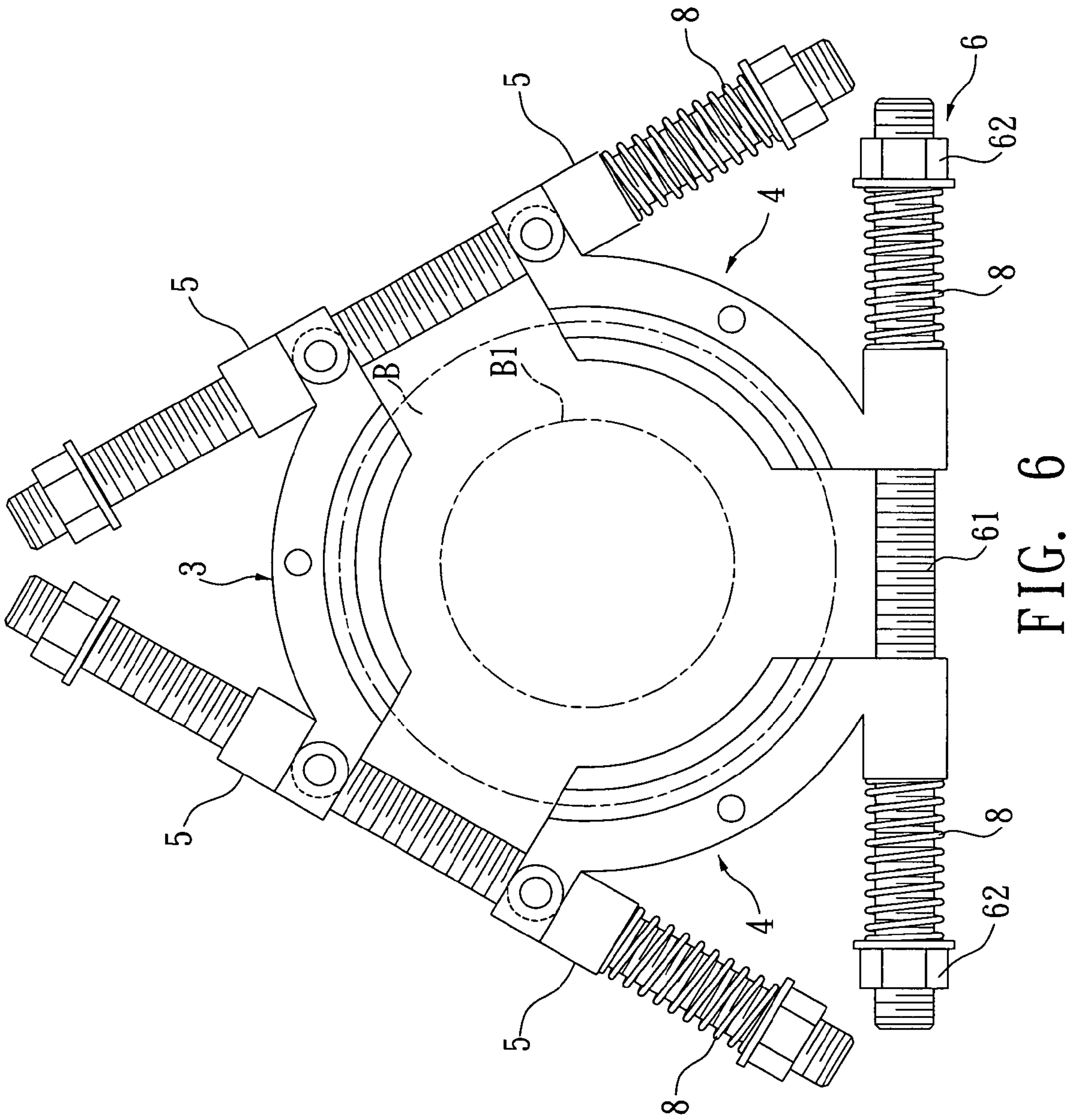
FIG. 6 is a schematic view of an application status in accordance with a second preferred embodiment of the present invention.

Of course, the present invention may have other embodiments with slight variations and modifications of the aforementioned embodiment. Referring to FIG. 6 for a second preferred embodiment of the present invention, a spring 8 is passed through the penetrating hole 45 of each second clamping element 4 separately on both ends of one of the adjusting rod module 6, and the other two adjusting rod modules 6 are passed through the penetrating hole 54 of the pivoting element 5 pivotally coupled to the pivotal connecting portion 43 of each second clamping element 4, and a spring 8 is pivotally coupled between an end of the screw nut 62 of one of the adjusting rod modules 6 passing through the penetrating hole 45 of each second clamping element 4 and each second clamping element 4, and between the screw nut 62 at an end of each second clamping element 4 proximate to the other two adjusting rod modules 6 and the pivoting element 5. When the clamping apparatus 10 is used, the spring 8 pulls each second clamping element 4 towards left and right sides for buffering the displacement caused by the increased distance between the clamping elements. In the meantime, each pivoting element 5 is used for guiding the bearing B to the center for the removal. In addition, the resilience of each spring 8 can resume each clamping element 3, 4 to its original position, so as to achieve the purpose of mounting the clamping apparatus 10 onto the bearing B.

Figure 7:
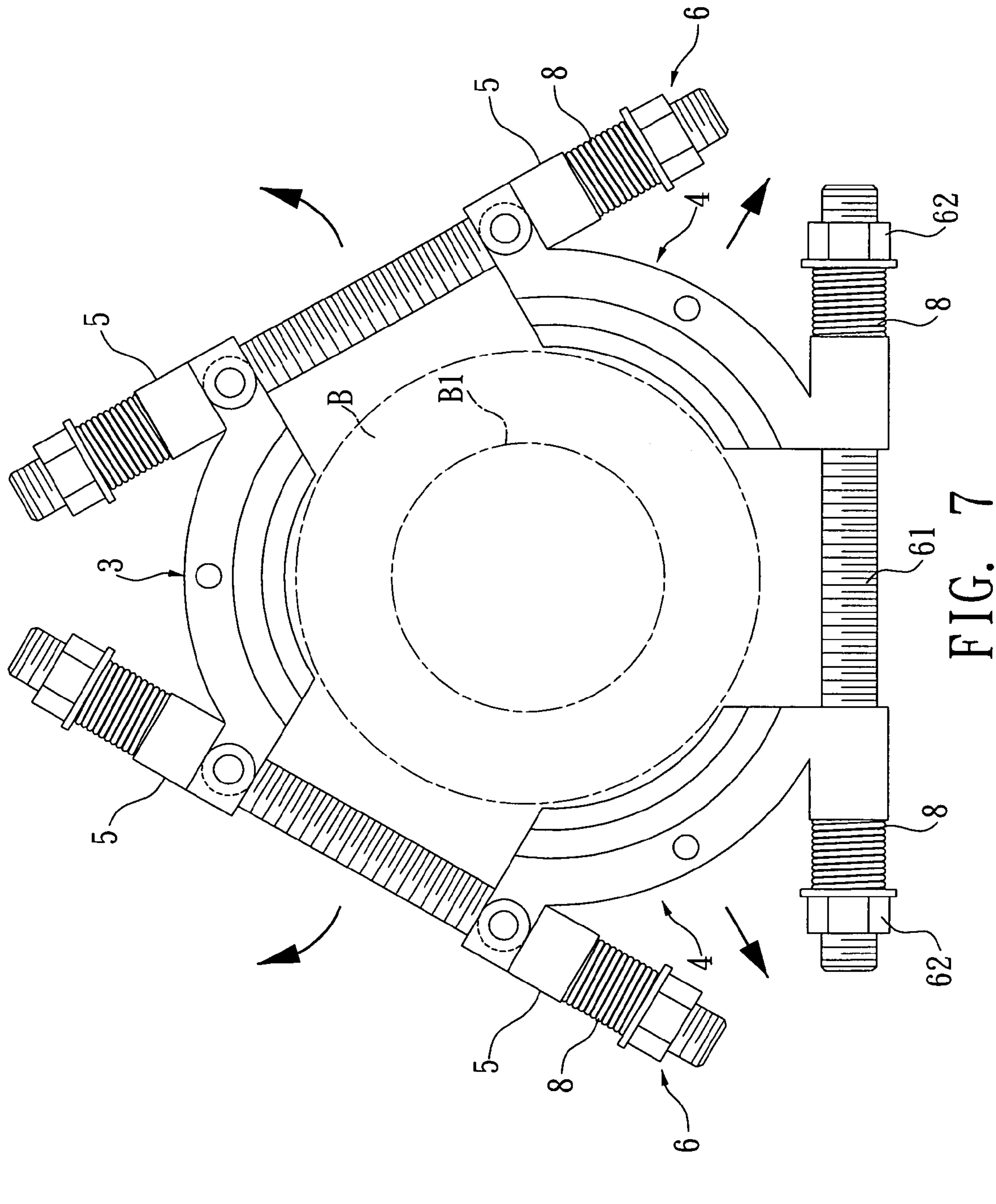
FIG. 7 is a schematic view of an application status in accordance with a third preferred embodiment of the present invention.
Figure 8:
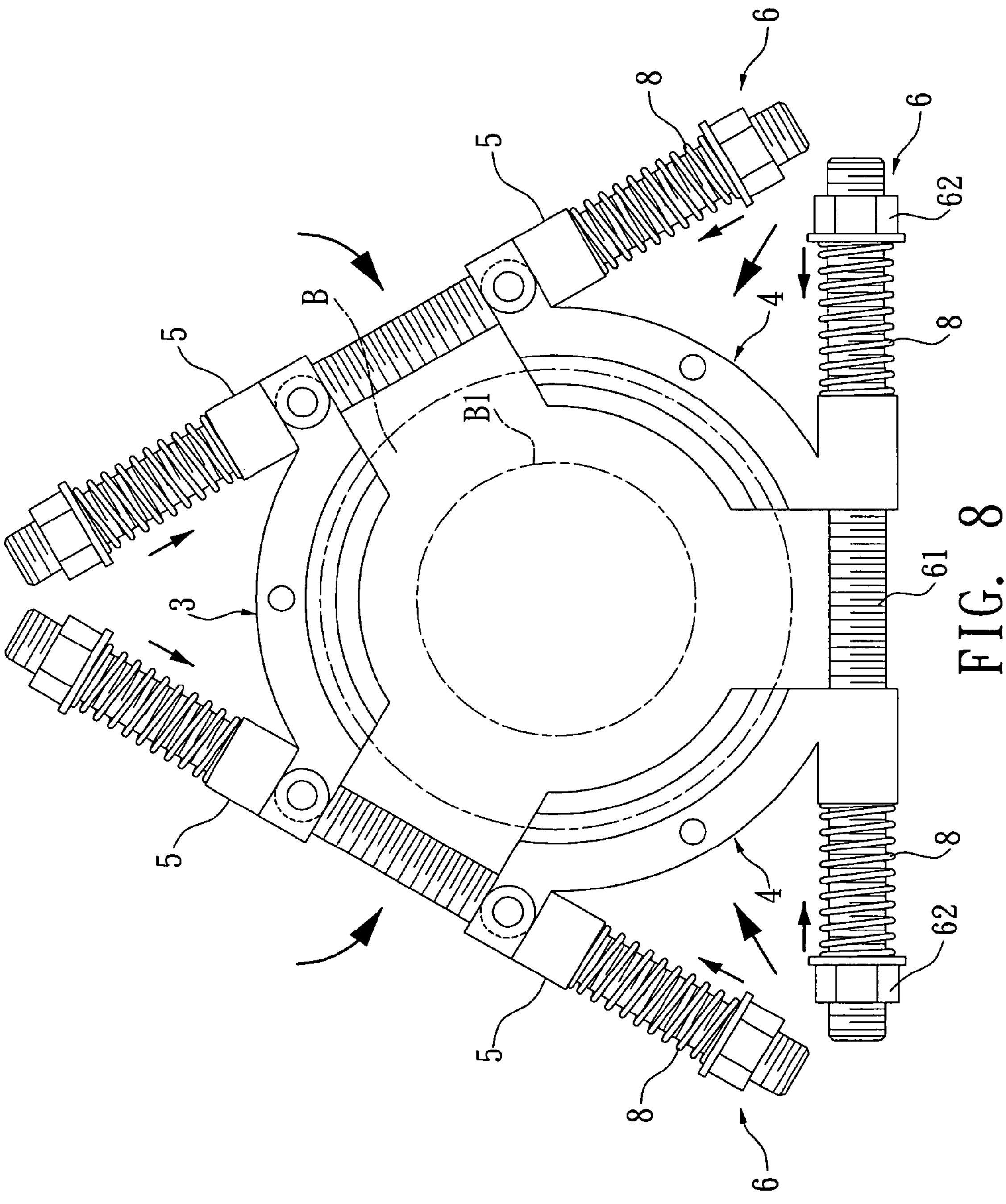
FIG. 8 is a schematic view of another application status in accordance with a third preferred embodiment of the present invention.

Referring to FIGS. 7 to 8 for a third preferred embodiment of the present invention, the number of springs 8 is increased, and they are passed through both ends of the adjusting rod modules 6 respectively, and each spring 8 is passed and abutted at one of the screw nuts 62 of the adjusting rod module 6 between the penetrating hole 45 of each second clamping element 4 and each second clamping element 4 and at the screw nuts 62 between an end of the other two adjusting rod modules 6 proximate to each second clamping element 4 and the pivoting element 5 for pressing against the screw nut 62 at another end of the other two adjusting rod modules 6 and the pivoting element 5 pivotally coupled to the first clamping element 3, and both ends of each adjusting rod module 6 separately have a spring 8. With the spring 8 installed to both ends of each adjusting rod module 6, the present invention not only achieves the effects as described in the foregoing preferred embodiment, but also simplifies the process of loosening the screw nuts, so as to install the clamping apparatus 10 easily and quickly.

Figure 9:
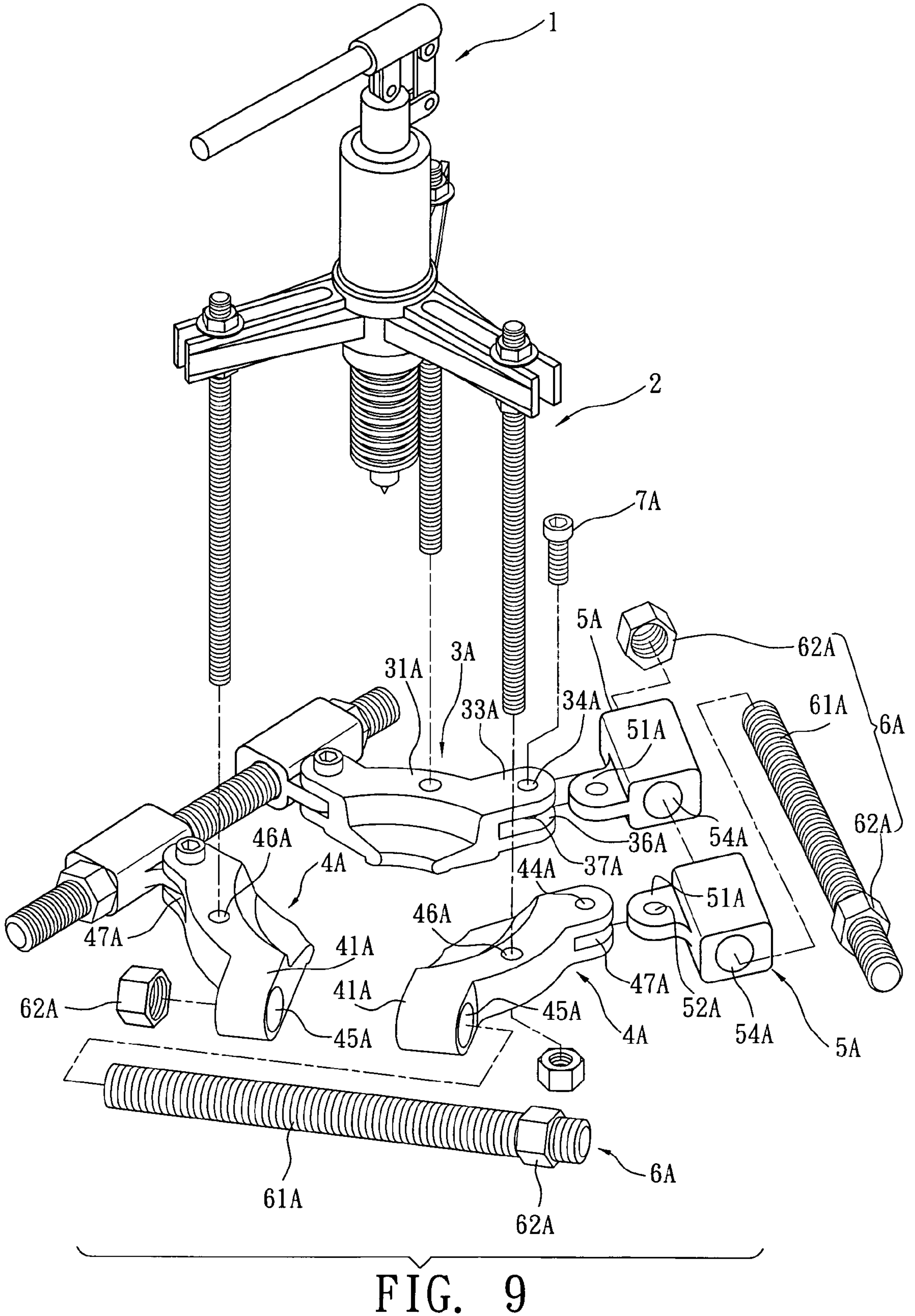
FIG. 9 is an exploded view of a fourth preferred embodiment of the present invention.
Figure 10:
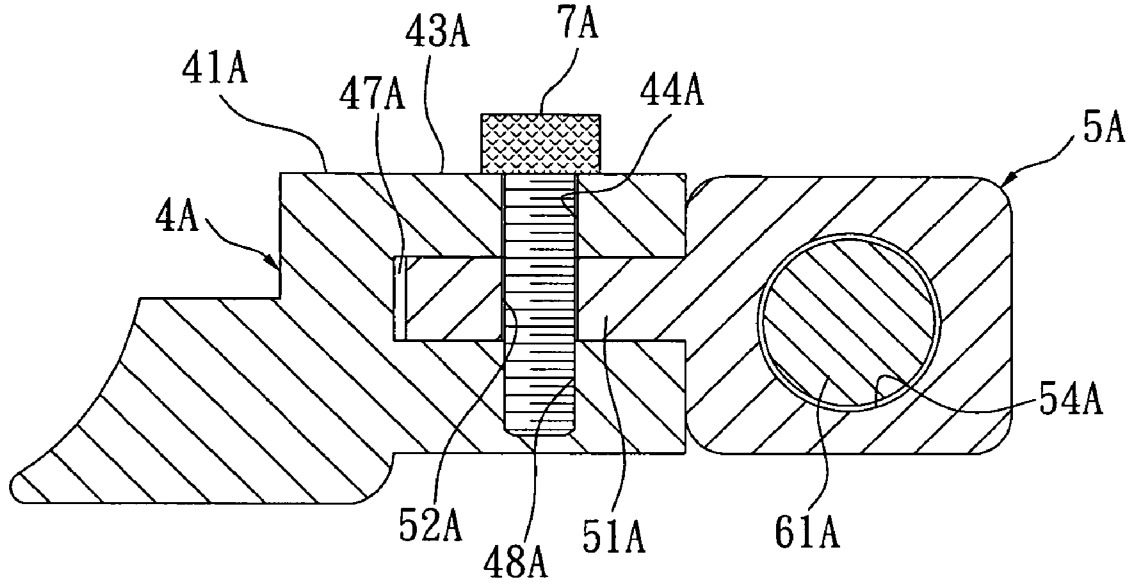
FIG. 10 is a sectional view of a portion of combining a second clamping element with a pivoting element as depicted in FIG. 9.
Figure 11:
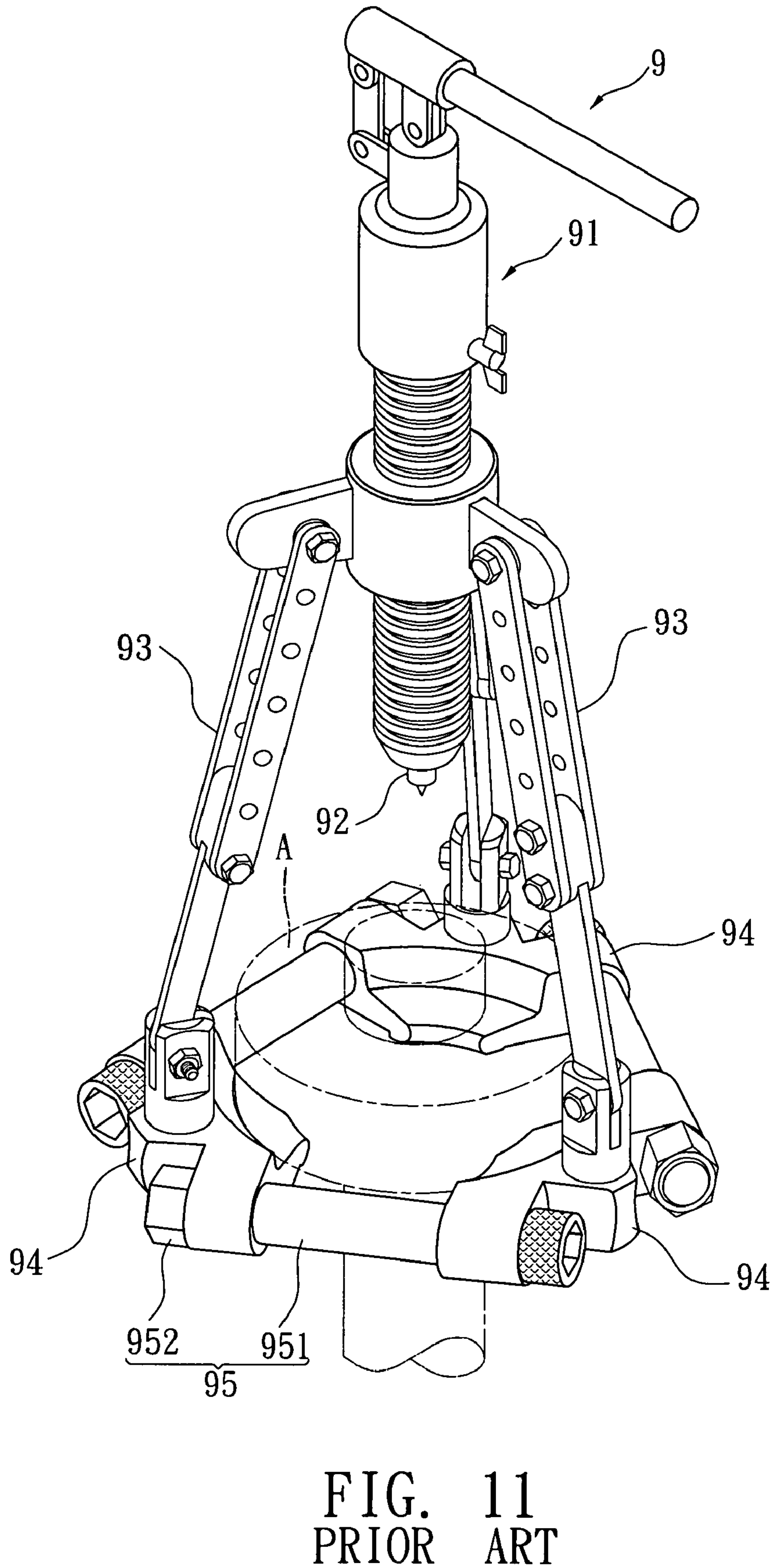
FIG. 11 PRIOR ART
FIG. 11 is a perspective view of a puller and its clamping apparatus in accordance with a prior art.

Referring to FIGS. 9 and 10 for a fourth preferred embodiment of the present invention, a pivotal connecting portion 33A disposed separately at both ends of a main body 31A of a first clamping element 3A includes a horizontal cut groove 36A, and the top of the cut groove 36A has a longitudinal through hole 34A, and the bottom of the cut groove 36A has a longitudinal screw hole 37A, and the through hole 34A and the screw hole 37A are disposed linearly with each other, and a pivotal connecting portion 43A of a main body 41A of each second clamping element 4A has a horizontal cut groove 47A corresponding to the pivotal connecting portion 33A disposed at an end of the first clamping element 3A, and the top of the cut groove 47A has a longitudinal through hole 44A, and the bottom of the cut groove 47A has a longitudinal screw hole 48A, and the through hole 44A and the screw hole 48A are also disposed linearly with each other, and another end of each main body 41A has a transverse penetrating hole 45A, and the axle centers of the penetrating holes 45A are aligned linearly with each other.

In addition, each pivoting element 5A has a protruding ear 51A protruded from each cut groove 36A of each corresponding clamping element 3A, 4A, 47A, and each protruding ear 51A has a longitudinal through hole 52A, and each pivoting element 5A has a parallel penetrating hole 54A at each cut groove 36A, 47A of the clamping element 3A, 4A, and the axle centers of the penetrating holes 54A are aligned linearly with each other.

Further, the protruding ear 51A of each pivoting element 5A is provided for pivotally coupling the cut groove 36A, 47A of each clamping element 3A, 4A, and a plurality of pivots 7A are passed through the through holes 34A, 44A of the first clamping element 3A and the second clamping element 4A respectively, and extended into the protruding ear 51A of each pivoting element 5A and secured to the screw holes 37A, 48A of the first clamping element 3A and the second clamping element 4A, so that each pivoting element 5A can be pivotally turned at the pivotal connecting portions 33A, 43A of the first clamping element 3A and the second clamping element 4A respectively, wherein the pivot 7A of this embodiment is a screw.

One of the adjusting rod modules 6A is passed through the penetrating hole 45A of each second clamping element 4A, and each of the other two adjusting rod modules 6A are passed through the penetrating hole 54A of each pivoting element 5A, such that the adjusting rod modules 6A are arranged substantially in a triangular shape, wherein each adjusting rod module 6A includes a screw rod 61A and two screw nuts 62A.

In summation of the description above, each clamping element 3A, 4A and each adjusting rod module 6A constitute the movement of four link rods, and the four pivoting elements 5A produce four pivoting points to increase the range between the clamping elements 3A, 4A for mounting the bearing B by the clamping apparatus and automatically guiding the clamping apparatus for an easy installation. Of course, a spring (not shown in the figure) can be installed between each pivoting element 5A and the screw nut 62A of each adjusting rod module 6A for buffering the displacement caused by the increased distance between the clamping elements. With the resilience of each spring, each clamping element can be resumed to its original position for mounting the clamping apparatus onto the bearing.

What is claimed is:

1. A clamping apparatus of a puller, installed at said bottom of an actuating element of said puller, and said actuating element including a driving element for abutting a bearing and an adjusting element having three pulling rods, and said clamping apparatus comprising:

a first clamping element, having a main body and a clamping portion, and said clamping portion and said main body having a height difference, and both ends of said main body individually having a pivotal connecting portion, and the central position of said main body having a coupling hole for connecting one of said pulling rods of said adjusting element;

two second clamping elements, each having a main body and a clamping portion, and said each clamping portion having a height difference with said main body, and said each main body having a pivotal connecting portion disposed at an end corresponding to said pivotal connecting portion of said first clamping element, and another end of said each main body having a transverse penetrating hole, and the axle center of said each penetrating hole of said two second clamping elements being disposed at the same linear position with each other, and the central position of said each main body having a coupling hole for connecting said other two pulling rods of said adjusting element;

four pivoting elements, each pivoting element being pivotally coupled to said each pivotal connecting portion of said first clamping element and each of said second clamping elements; and three adjusting rod modules, one of said adjusting rod modules passing through each penetrating hole of said two second clamping elements, and two of said adjusting rod modules passing through each penetrating hole of said four pivoting elements, such that said adjusting rod modules are substantially in a triangular shape;

wherein said each pivotal connecting portion includes a longitudinal through hole, and said each pivoting element includes a horizontal cut groove, and the top of said each cut groove includes a longitudinal through hole, and the bottom of said each cut groove includes a longitudinal screw hole, and said through hole and said screw hole are disposed linearly with each other, and said cut groove of each pivotal connecting member is provided for pivotally coupling said each pivotal connecting portion of said first clamping element and said second clamping element, and a plurality of pivots are passed through a through hole of said each pivoting element, and extended into said through holes of said first clamping element and said second clamping element, and secured into a screw hole of said each pivoting element for pivotally turning said pivotal connecting portion of said first clamping element and said second clamping element respectively.

2. The clamping apparatus of a puller as recited in claim 1, wherein said each main body is substantially in an arc shape.

3. The clamping apparatus of a puller as recited in claim 1, wherein said pivot is a screw.

4. The clamping apparatus of a puller as recited in claim 1, wherein said each adjusting rod module includes a screw rod and two screw nuts, and one of said screw rod is passed through a penetrating hole of said each second clamping element, and said other two screw rods are passed through penetrating holes of said pivoting element pivotally coupled to said pivotal connecting portion of said each second clamping element, and a penetrating hole of said pivoting element pivotally coupled to said pivotal connecting portion of said first clamping element, and said each screw nut is secured separately to both ends of said each screw rod for positioning said each clamping element.

5. The clamping apparatus of a puller as recited in claim 4, wherein one of said adjusting rod modules passed through a penetrating hole of said each second clamping element includes a spring passing through both ends, and said other two adjusting rod modules have a spring passing through a penetrating hole at an end of pivoting element pivotally coupled to said pivotal connecting portion of said each second clamping element, and said each spring abuts between a screw nut of one of said adjusting rod modules passing through said penetrating hole of said each second clamping element and said each second clamping element, and between a screw nut at an end of said other two adjusting rod modules proximate to said each second clamping element and said pivoting element.

6. The clamping apparatus of a puller as recited in claim 4, wherein both ends of said each adjusting rod module have a spring, and each spring abuts between a screw nut of one of said adjusting rod modules passing through said penetrating hole of said each second clamping element and said each second clamping element, and between a screw nut at an end of said two adjusting rod modules proximate to said each second clamping element and said pivoting element for abutting a screw nut at another end of said two adjusting rod modules and a pivoting element pivotally coupled to said first clamping element.

7. A clamping apparatus of a puller, installed at said bottom of an actuating element of said puller, and said actuating element including a driving element for abutting a bearing and an adjusting element having three pulling rods, and said clamping apparatus comprising:

a first clamping element, having a main body and a clamping portion, and said clamping portion and said main body having a height difference, and both ends of said main body individually having a pivotal connecting portion, and the central position of said main body having a coupling hole for connecting one of said pulling rods of said adjusting element;

two second clamping elements, each having a main body and a clamping portion, and said each clamping portion having a height difference with said main body, and said each main body having a pivotal connecting portion disposed at an end corresponding to said pivotal connecting portion of said first clamping element, and another end of said each main body having a transverse penetrating hole, and the axle center of said each penetrating hole of said two second clamping elements being disposed at the same linear position with each other, and the central position of said each main body having a coupling hole for connecting said other two pulling rods of said adjusting element:

four pivoting elements, each pivoting element being pivotally coupled to said each pivotal connecting portion of said first clamping element and each of said second clamping elements; and three adjusting rod modules, one of said adjusting rod modules passing through each penetrating hole of said two second clamping elements, and two of said adjusting rod modules passing through each penetrating hole of said four pivoting elements, such that said adjusting rod modules are substantially in a triangular shape, wherein said each pivotal connecting portion includes a horizontal cut groove, and the top of said each cut groove includes a longitudinal through hole, and the bottom of said each cut groove includes a longitudinal screw hole, and said through hole and said screw hole are disposed linearly with each other, and said each pivoting element includes a protruding ear, and each protruding ear includes a longitudinal through hole, and said protruding ear of said each pivoting element is provided for pivotally coupling said cut groove of said each clamping element, and a plurality of pivots are passed through said through holes of said first clamping element and said second clamping element, and extended into said protruding ear of said each pivoting element and secured to screw holes of said first clamping element and each second clamping element, for pivotally turning said each pivoting element at said pivotal connecting portion of said first clamping element and said second clamping element respectively.

8. The clamping apparatus of a puller as recited in claim 7, wherein said pivot is a screw.

9. The clamping apparatus of a puller as recited in claim 7, wherein said each adjusting rod module includes a screw rod and two screw nuts, and one of said screw rod is passed through a penetrating hole of said each second clamping element, and said other two screw rods are passed through penetrating holes of said pivoting element pivotally coupled to said pivotal connecting portion of said each second clamping element, and a penetrating hole of said pivoting element pivotally coupled to said pivotal connecting portion of said first clamping element, and said each screw nut is secured separately to both ends of said each screw rod for positioning said each clamping element.

10. The clamping apparatus of a puller as recited in claim 9, wherein one of said adjusting rod modules passed through a penetrating hole of said each second clamping element includes a spring passing through both ends, and said other two adjusting rod modules have a spring passing through a penetrating hole at an end of pivoting element pivotally coupled to said pivotal connecting portion of said each second clamping element, and said each spring abuts between a screw nut of one of said adjusting rod modules passing through said penetrating hole of said each second clamping element and said each second clamping element, and between a screw nut at an end of said other two adjusting rod modules proximate to said each second clamping element and said pivoting element.

11. The clamping apparatus of a puller as recited in claim 9, wherein both ends of said each adjusting rod module have a spring, and each spring abuts between a screw nut of one of said adjusting rod modules passing through said penetrating hole of said each second clamping element and said each second clamping element, and between a screw nut at an end of said two adjusting rod modules proximate to said each second clamping element and said pivoting element for abutting a screw nut at another end of said two adjusting rod modules and a pivoting element pivotally coupled to said first clamping element.

* * * * *